Feb. 28, 1939. A. A. GROSSARTH 2,148,457
METHOD OF MANUFACTURING PRINTING-PRESS DOCTOR BLADES
Original Filed Aug. 10, 1936
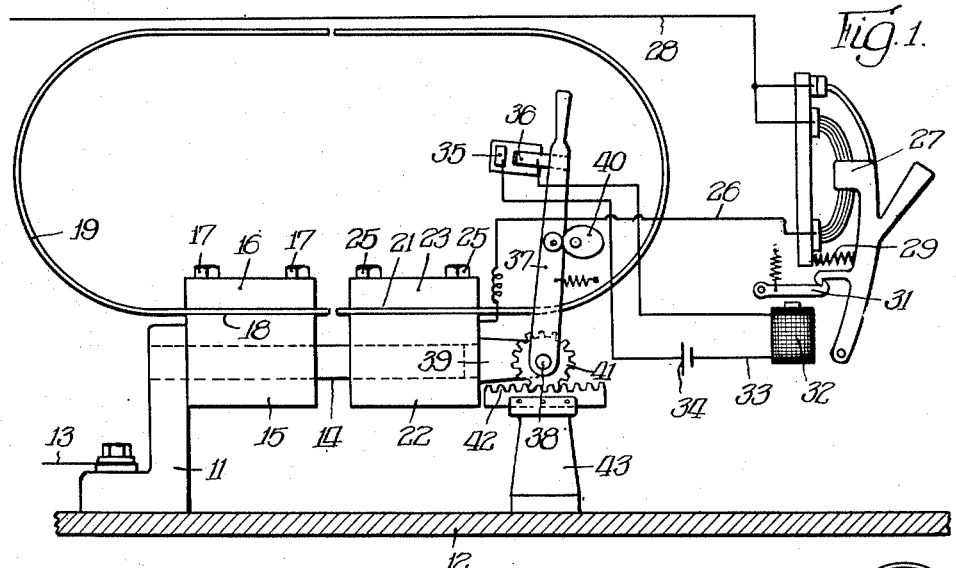
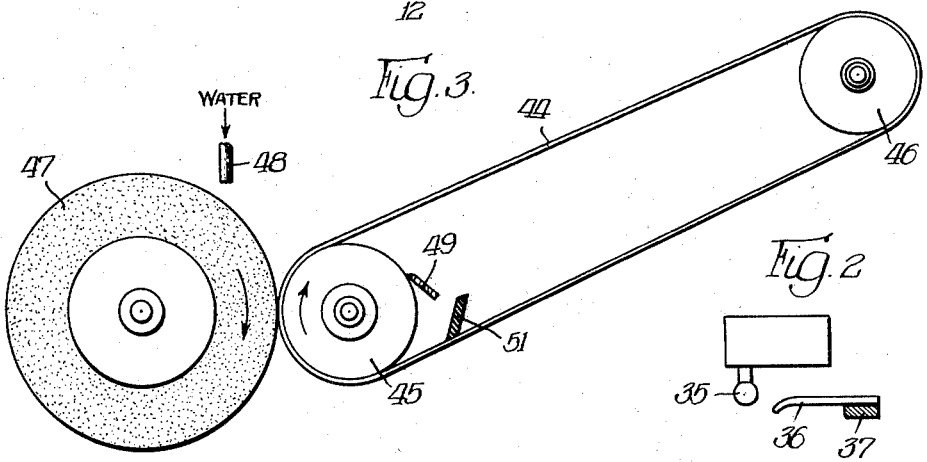
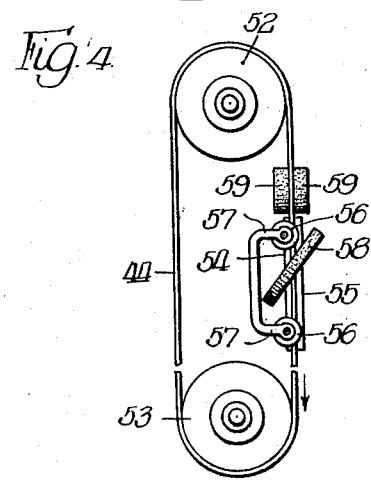
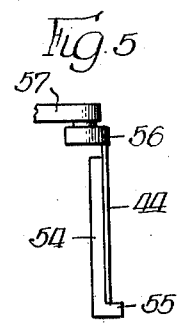
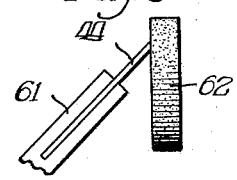
Inventor:
Albert A. Grossarth,
By Walter M. Fuller atty.

Patented Feb. 28, 1939

2,148,457

UNITED STATES PATENT OFFICE 2,148,457

METHOD OF MANUFACTURING PRINTING-PRESS DOCTOR BLADES

Albert A. Grossarth, La Grange, Ill., assignor to Miehle Printing Press & Manufacturing Company, Chicago, Ill., a corporation of Illinois Original application August 10, 1936, Serial No. 95,299. Divided and this application June 4, 1937, Serial No. 146,426

10 Claims. (Cl. 29—148)

Printing with an intaglio or gravure printing-plate incorporating depressed or etched ink-wells in its surface involves the use of a so-called ink-wiping doctor-blade which, by bearing on the surface of the moving or rotary plate, scrapes the ink off its surface, leaving the ink-wells, however, filled or charged with ink which is delivered from such cavities or recesses onto the paper during the printing operation.

The active, sharp, ink-wiping, operative edge of such doctor-blade must be maintained in keen condition and free from all nicks, roughnesses, ridges, bends, etc., as otherwise it will not properly wipe or scrape, and will injure, the copper printing-plate with which it coacts and which carries the etched image or design being printed.

It became desirable to make such doctor-blades endless or continuous, but owing to their high-carbon, resilient characteristics, and especially their required thinness, about $5/1000$ of an inch, it was found that none of the well-known welding firms could perform this work and none of the manufacturing concerns producing welding-equipment could provide means for satisfactorily welding together the ends of such a band or blade to make it continuous or endless and at the same time have the blade possess those qualities necessary to its proper functioning.

Accordingly, it became essential to invent a new and improved method of making such endless doctor-blades, which resulted in the development of the present procedure involving both the finished blade or band and its method of production.

The welded joint portion of the blade must have practically all the same physical characteristics as the remainder of the blade, as otherwise such short length of the blade at the joint will have a different ink-wiping effect on the etched or engraved printing-plate than the balance of the blade will have, and this difference will be apparent in the finished print.

Stated somewhat differently, the welded joint should be of exactly the same thickness as the other portions of the blade, it should have the same resilient or spring properties or temper as the balance of the blade, and it should be free from defects, such as holes or lack of metallic uniformity.

Owing to the indispensable thinness of the blade, the procurement of a weld of this kind presented very substantial difficulties, which, however, after extended material efforts have been overcome by means of the employment of the principles of the present invention.

In carrying out the new procedure, in its preferred practice, assuming that the final blade is to be $5/1000$ inch thick and about 1½ inches wide, a high-carbon, tempered, steel band of such width, but about $10/1000$ inch thick, has its two ends clamped to a pair of electrodes or electric-contacts, so that the two ends are exactly opposite one another and are exactly parallel, it being understood, of course, that these two ends are first cut at precisely right-angles to the length of the band.

Thereupon, the two opposed ends of the blade or band are slid or pushed into contact with one another which immediately establishes the flow of welding electric current therethrough and at almost the same instant the flow of such current is terminated by opening the circuit.

By accurately gauging the moment and speed of contact of the two extremities of the band together, the amount of pressure exerted between such ends which determines the degree of metal upsetting, and the instant of current termination, a satisfactory electric butt-weld can be accomplished, but all of these factors are of great importance and all essential conditions must be carefully complied with, as otherwise a defective weld will result.

The registered ends of the blade or band must be brought together for such welding at such a speed as to preclude the burning away of the metal which would provide holes through the weld, and, on the other hand, if such contact is made too slowly, then the metal burns away and no proper metal contact will result.

Again, if the contact is made too quickly, the resulting weld will not be reasonably true and flat.

From what precedes, it will be apparent that a practically perfect weld is necessary, and this can be accomplished by proper attention to the several factors referred to.

At the welded joint, the metal builds up on both sides of the band and this, of course, must be removed, but before this is done, the metal at the weld, which is practically glass-hard, is drawn to the same spring temper as the remainder of the band by the welded part of the band being immersed in a thermometer-equipped salt bath which is raised to a temperature of about 600° Fahrenheit, this action having no effect on the unwelded parts of the band.

The result is that the entire endless band or blade is now of the same spring temper throughout.

Thereupon, first by the use of a file and then by the employment of an oil-stone, the excess metal is removed from both sides of the band at its welded section, thus providing an endless blade of uniform thickness in every part.

Now the continuous metal band is carefully ground, preferably over both of its two surfaces, to reduce its thickness to approximately its final thickness of about 5/1000 inch, and care is exerted to be certain that the surface over which the band passes during such grinding is perfectly clean as well as the face of the band engaging such surface, so that the ground band or blade may be of uniform thickness throughout without the formation of any blisters, hollows, irregularities, or other defects.

Thereafter, both edges of the band are ground true at right-angles to the faces of the blade, and then one of such edges is bevel-ground and honed to provide a true, sharp, and perfect ink-wiping edge, and when thus treated the continuous, flexible, thin, sharp-edged blade or band is in its ultimate form.

In some cases, the commercial blade may be that with the edges at right-angles to the blade and the final bevelling may be effected by grinding and honing means on the printing-press on which the blade is used, or, in other instances, the bevelling may be dispensed with.

The finished doctor-blade is of uniform thickness, uniform width, uniform spring temper, and uniform metal density and it may be described as unvaried throughout as to all of its physical properties, and, in fact, it is very difficult and almost impossible to detect the location of the weld.

The means by which the foregoing operations may be advantageously performed are illustrated in the accompanying drawing forming a part of this specification and to which reference should be had in connection with the following description.

In this drawing:

Figure 1 illustrates the welding means somewhat diagrammatically;

Figure 2 is a horizontal section showing one of the electric-switches more in detail;

Figure 3 presents the means for grinding the surfaces of the endless blade or band;

Figure 4 shows the method of grinding the edges of the blade;

Figure 5 illustrates a part of the same mechanism; and

Figure 6 depicts the final edge-bevelling.

Referring to Figure 1, it will be noted that a stationary bracket 11 is fixedly mounted on a suitable base or support 12, an upstanding part of the bracket carrying a horizontal stud-shaft 14 and a suitably-insulated, electrically-conductive terminal comprising a block 15 mounted on the immovable bracket and connected to a wire or cable 13 of an electric power circuit, a top clamp-plate 16, and screws 17 adapted to fasten the two parts 15 and 16 together with one end portion 18 of the high-carbon tempered steel band 19 between them.

The other end 21 of such band is similarly secured between an electrically-conductive block 22, slidable longitudinally on the stationary stud-shaft 14, and an upper plate or block 23 held in place by fastening screws 25, part 22 being connected by an electric-conductor 26 to one terminal of an appropriate circuit-breaker 27, the other terminal of which is joined by a cable or wire 28 to the same source of electric current as is also the conductor 13.

Such circuit-breaker, which is of ordinary or usual construction, tends by reason of its expansion-spring 29, to open the circuit, but the circuit-breaker may be held closed by the pivoted spring-actuated latch 31 which may be rocked down by the electro-magnet 32, the latch acting as the armature, to release the movable contacts of the circuit-breaker permitting the latter to open and to interrupt the flow of the welding electric current.

Such electro-magnet 32 is in a circuit 33 including a source of electrical-energy 34 and a fixed contact 35 adapted to coact with a movable contact 36 in the circuit and mounted on a rock-arm 37 on a shaft 38 journalled in a bracket 39 on the slidable block or terminal 22, the shaft having a small gear or pinion 41 fixed thereon, turnable with the shaft, and in mesh with a stationary rack 42 mounted on a standard 43 on the base, all as is clearly illustrated.

Instead of providing the electro-magnet in a separate circuit, as shown, it and its connections may be shunted across the main circuit through the circuit-breaker.

From what precedes, it will be apparent that, when the arm 37 is rocked to the left, as viewed in Figure 1, the terminal 22, 23 and the clamped end 21 of the thin band 19 will be moved in the same direction toward the other anchored end 18 of the same band.

Such arm may be thus rocked by hand or by mechanical means which will afford a predetermined speed and extent of travel of the movable end of the band toward its companion stationary end.

The arm may be thus actuated by a suitably-shaped cam 40 engaging a roller thereon and rotating at a definite speed by appropriate mechanical hydraulic or electrical means, which will determine the speed of approach of the band ends together and the degree of upsetting of such ends as they become welded together.

Assuming that the two ends 18 and 21 of the band 10/1000 inch thick have been clamped to their respective terminals 15 and 22 and project therefrom toward one another the exact amounts required and that the circuit-breaker 27 has been closed, the arm 37 is rocked either manually or by the mechanical means depicted, thus bringing the band's ends into abutting engagement which immediately establishes the flow of the electric-current therethrough thus initiating the welding operation.

Almost immediately contact 36 engages the complementary contact 35 thus closing the circuit 33, energizing magnet 32, which attracts and pulls down its armature latch 31, and causing the breaking of the circuit by the opening of the circuit-breaker, which action of course immediately terminates the flow of the welding current.

The operations and extent of movements of the parts of the mechanism are so timed that a suitable weld is obtained, the complete action occurring almost momentarily.

The endless welded band having been removed from the machine, its welded section is brought to the same temper as the remainder of the band by the salt bath raised to 600° Fahrenheit referred to hereinbefore.

By means first of a file and subsequently the use of an oil-stone, the excess metal is removed from both sides of the now endless band or blade at the welded joint, so that the continuous band is of equal thickness 10/1000 inch throughout.

It is now necessary to grind this band down to the required thinness, preferably down to about 5/1000 inch thickness, and this is accomplished by the mechanism shown in Figure 3.

Such endless band, designated as a whole 44, (Figure 3), is extended around two pulleys 45 and 46 held the proper distance apart to keep the band taut thereon, the one pulley 45 being power-rotated in the direction indicated by the arrow so that the band travels with uniform speed around the two pulleys.

As is clearly illustrated, a power-driven grinding-wheel 47 revolved in the direction shown and supplied with water from a pipe 48 bears against and grinds down the outer surface of the band as it passes around its pulley or drum 45, thus gradually reducing the thickness of the band throughout, the grinding-wheel being broad enough to more than cover the width of the band.

The removal of the metal by such grinding operation takes place during several complete travels of the band around its supporting and driving pulleys so that the thickness reduction occurs more or less gradually.

If it is desired to grind both surfaces of the band, after its one surface has thus been ground in appropriate amount, the band is removed from its pulleys, turned inside out, and replaced thereon, whereupon the grinding is continued on the now outer surface which was formerly the inside surface.

In order that no foreign matter may find entrance between the traveling band and its pulley 45, the presence of which would cause improper grinding and a resulting defective product, a steel-blade scraper 49 bears on that portion of the surface of the pulley 45 not covered by the band to remove anything adhering to the face of the pulley, and, as an extra precaution, a rubber-wiper 51 coacts with and bears on the lower stretch of the band adjacent to the pulley 45 to remove any dirt, dust, or particles of metal clinging to the band.

The band, having been reduced to the needed thickness in this manner, it now becomes necessary or desirable to grind both edges of it to assure its uniform width and straightness, and, accordingly, the band is applied around two suitably-spaced pulleys 52 and 53 (Figure 4) either one or both of which may be power-rotated.

As is shown perhaps more clearly in Figure 5, one length of the band between the pulleys travels along a support 54 with the lower edge of the band riding on the outstanding foot 55 of such support, and, in order to hold the moving band down on such foot, two, spaced-apart, horizontal, revoluble rollers 56, 56 mounted on stationary arms 57, 57 are used to bear on the top edge of the blade, and, between these rollers, a power-driven grinding-wheel 58, arranged oblique to the plane of the band, grinds the upper traveling edge of the band true and at a right-angle to the plane of the band, two stones 59, 59 engaging opposite sides of the band removing any burrs thereon developed by the grinding-wheel.

One edge of the band having been ground in the manner stated, the band is reversed on the appliance of Figure 4, and its opposite edge ground in like manner.

An endless doctor-blade thus finished is usable satisfactorily in some relations, but it is preferable to grind and hone one edge to a bevel and this is accomplished by feeding the band along a backing-support 61 (Figure 6) with one edge of the band bearing against the side face of a power-rotated grinding-wheel 62, and then, in like manner, against the side face of a power-revolved honing-wheel, not necessary to illustrate.

The completed continuous flexible blade, whether bevelled or not, is uniform and unvarying as to its entire physical characteristics throughout all of its parts and, so far as is known, no one heretofore has been able to produce an endless blade or band of the specified thickness having such unvarying likeness as to all of its properties.

As has been indicated, it is essential that the circuit of the electric-welding current be interrupted almost as soon as the flow of the current is established, due to the thinness of the stock undergoing the welding operation, and a simple means has been shown for accomplishing this result, but the opening of the circuit-breaker or other method of terminating the current flow may be effected by the degree or strength of light emitted by the sparks at the weld as determined by a photoelectric-cell, or by the current which flows immediately upon the two ends of the bands coming into contact with one another, or by the small mechanical resistance which is encountered as the ends of the band are squeezed together during the welding operation.

Those acquainted with this art will understand that this invention, as defined by the appended claims, is not necessarily limited to the precise and exact details set forth above and modifications may be resorted to without departure from the heart and essence of the invention and without the loss or sacrifice of any of its material benefits and advantages.

The door-blade set forth in this patent application constitutes the subject-matter of my patent application Serial No. 95,299, filed August 10, 1936, of which this patent application is a division.

Experience has demonstrated that the speed of approach toward one another of the two ends of the metal band during the welding operation should be as rapid as practically possible, in other words, substantially instantaneous. This is an important factor in order to obtain a successful weld, it having been discovered that in operating the hand-lever, when manual operation is resorted to by which the two ends of the band are moved toward one another, this lever should preferably be actuated so that the operator stands in front of the apparatus and that his arm should be at right angles with the lever with merely one finger operating such lever rather than with the operator's arm following the direction of movement of the lever. In this way the contact of the two ends of the band is accomplished in a flick-like manner.

The degree of pressure exerted between the two ends of the band to secure the proper weld should be very light and under ordinary circumstances should not exceed five pounds.

The approximate period of electric current flow should preferably be substantially instantaneous, that is, not over one-fifth of a second, as otherwise the edges where the weld has to be produced will burn or holes will be present on the line of welding.

I claim:

1. In the making of an endless doctor-blade for printing-presses, butt-welding together the ends of a substantially uniform-thickness tempered steel strip of approximately 10/1000 inch thick, drawing the temper of the weld in a salt bath at about 600° Fahrenheit to that of the remainder of the endless blade, removing the excess metal from both sides of the blade at the weld to make the blade of uniform thickness throughout, grinding both sides of the blade throughout their entire surfaces to reduce the blade to a uniform thickness of approximately $5/1000$ inch, grinding both edges in the blade in parallelism and bevel-grinding one of such edges.

2. In the making of an endless doctor-blade for printing-presses, the steps of butt-welding together the ends of a strip of substantially-uniformly-thick tempered steel, drawing the temper of the weld to that of the remainder of the endless blade, removing the excess metal at the weld thereby rendering the blade of uniform thickness throughout, reducing the entire blade to substantially-lesser uniform thickness, and grinding the opposite edges of the blade.

3. The method presented in claim 2 in which said grinding of the opposite edges of the blade is in parallel relation and at right-angles to the body of the blade.

4. The method presented in claim 2 in which said grinding of the opposite edges of the blade bevels at least one edge of the blade.

5. The method presented in claim 2 in which said reduction of the thickness of the endless blade is effected by grinding the entire surfaces of both faces of the blade.

6. The method presented in claim 2 in which the original metal-strip is approximately $10/1000$ inch thick, the excess metal at the weld is removed from both of the opposite faces of the blade, and the reduction of the thickness of the blade is effected by grinding the entire surfaces of of both faces of the blade.

7. The method set forth in claim 2 in which said original metal-strip is approximately $10/1000$ inch thick.

8. The method set forth in claim 2 in which the thickness reduction of the blade reduces the blade to a thickness of approximately $5/1000$ inch.

9. The method set forth in claim 2 in which said original metal-strip is approximately $10/1000$ inch thick and in which the thickness reduction of the blade is effected by grinding the blade to a thickness of approximately $5/1000$ inch.

10. The method set forth in claim 2 in which said weld temper drawing is effected at a temperature of about 600° Fahrenheit.

ALBERT A. GROSSARTH.